US006285690B1

(12) United States Patent
Kim et al.

(10) Patent No.: US 6,285,690 B1
(45) Date of Patent: Sep. 4, 2001

(54) IGNITION FEEDBACK REGENERATIVE FREE ELECTRON LASER (FEL) AMPLIFIER

(75) Inventors: Kwang-Je Kim, Burr Ridge, IL (US); Alexander Zholents, Walnut Creek; Max Zolotorev, Oakland, both of CA (US)

(73) Assignee: Bennett Optical Research, Inc., Ridgecrest, CA (US)

( * ) Notice: Subject to any disclaimer, the term of this patent is extended or adjusted under 35 U.S.C. 154(b) by 0 days.

(21) Appl. No.: 09/361,675

(22) Filed: Jul. 27, 1999

(51) Int. Cl.[7] ........................................... H01S 3/00
(52) U.S. Cl. ........................ 372/2; 359/341; 359/335
(58) Field of Search .................... 359/335, 353; 372/2, 10, 12, 29.11

(56) References Cited

U.S. PATENT DOCUMENTS

| | | | | |
|---|---|---|---|---|
| 4,287,488 | * | 9/1981 | Brau et al. ........................ | 331/94.5 |
| 4,479,218 | * | 10/1984 | Brau et al. ........................ | 372/2 |
| 4,864,098 | * | 9/1989 | Basanese et al. ................ | 219/121.61 |
| 5,023,563 | * | 6/1991 | Harvey et al. ................... | 372/2 |
| 5,029,172 | * | 7/1991 | Edighoffer ....................... | 372/2 |
| 5,960,013 | * | 9/1999 | Sheffield .......................... | 372/2 |
| 6,137,811 | * | 8/2000 | Sprangle et al. ................. | 372/2 |

* cited by examiner

Primary Examiner—William A. Cuchlinski, Jr.
Assistant Examiner—Deandra Hughes
(74) Attorney, Agent, or Firm—Kenneth G. Pritchard

(57) ABSTRACT

An ignition feedback regenerative amplifier consists of an injector, a linear accelerator with energy recovery, and a high-gain free electron laser amplifier. A fraction of the free electron laser output is coupled to the input to operate the free electron laser in the regenerative mode. A mode filter in this loop prevents run away instability. Another fraction of the output, after suitable frequency up conversion, is used to drive the photocathode. An external laser is provided to start up both the amplifier and the injector, thus igniting the system.

64 Claims, 1 Drawing Sheet

IGNITION FEEDBACK REGENERATIVE FREE ELECTRON LASER (FEL) AMPLIFIER

The United States Government has rights in this invention pursuant to Contract No. DE-AC03-76SF00098 between the U.S. Department of Energy and the University of California, for the operation of Lawrence Berkeley National Laboratory and Agreement BG97-100(00) between Lawrence Berkeley National Laboratory and the City of Ridgecrest, Calif.

BACKGROUND OF THE INVENTION

Electrical power has always been a limiting factor for satellites, and it restricts the services that they can perform. The need for additional transponders to satisfy the demand for satellite-supplied television, e-mail, worldwide web, long distance telephones, rapid computer data transfer, and many other types of telecommunication is increasing. The number of transponders has risen from about 24 active transponders per satellite in the late 1980's to 94 active transponders on the latest Hughes satellite launched in late 1997. The demand for additional power for transponders over the last few years fits an exponential curve and the end is not in sight. The only practical limitation for generation of the additional power for transponders is the availability of electricity from the solar panels carried on the satellite. At present the size of satellite solar panels is effectively at a maximum. Additional satellites in the same "space slot" can be deployed to increase the total solar panel area, and this is the direction that many satellite companies are going. A major drawback of this approach is that the output signals of the various satellites are not in phase, so interference between satellite transmissions can be a problem. A bigger drawback, however, is that the multiple satellite approach is very expensive.

One way to power the satellites is laser power beaming, (LPB). Laser beams can increase the power level an order of magnitude above that available from the sun. The wavelength 840 nm is within one of the transmission windows of the atmosphere, and at the same time near the peak of the photo-voltaic conversion efficiency of Si the most commonly used material for the solar panels. Beaming from the earth's surface requires the laser beam to travel through our planet's atmosphere. The atmosphere causes various problems such as scattering, absorption and distortion. The development of adaptive optics has helped solve this problems.

Free electron lasers, FELs, are capable of generating high power optical radiation without using a material medium. Unlike other lasers, which all utilize changes of electronic energy levels in a material, the light in a free electron laser is generated in a vacuum and should have no distortion. This characteristic of free electron lasers makes them ideal for generation of high power light with a diffraction limited light beam. This high quality beam can propagate through the atmosphere to great distances. This ability is due to a distortion-free initial wave front which allows all of the required corrections to result only from the atmospheric imperfections. This correction technique is now well known.

The light in an FEL is emitted from bunches of electrons traveling at very nearly the velocity of light. They are deflected by a series of magnetic poles. When the electrons are deflected, an electro-magnetic wave is radiated. The apparatus causing this deflection contains small magnets oriented somewhat like the teeth of two interlocking combs and consists of magnets with alternate north and south poles. This system is called an undulator, or in more vernacular terms a "wiggler" since it wiggles the electron bunches, which then emit light. If there is a light beam of an appropriate frequency in the vicinity of these electrons, the phenomenon of stimulated emission occurs. The electrons emit light in phase and at the same frequency as the initial light, creating Light Amplification by Stimulated Emission of Radiation or a LASER. Current state of the art for FEL generating visible light is an average power level 1–10 W. Main problems to be solved before FELs can produce hundreds of kW of optical power include (1) production of a high average current electron beam with low emittance, (2) high thermal loading in mirrors, and (3) radiation hazards from a high average power high energy electron beam.

As was mentioned above, one of the most attractive features of FELs is the possibility of generating fully transverse coherent light, having high average power. On the other hand, the efficiency of the conversion of the electron beam power to the light power is rather small in an FEL, being typically not more than a few percent. For high light power application, therefore, it is necessary to use an intense average electron beam current. In the FEL producing visible light, this beam must have high quality, i.e. it must have a low transverse and longitudinal emittance. Radio frequency (RF) photocathode guns are, in principle, capable of production of an electron beam of adequate quality, but they need a laser driver which supplies the photocathode with photons. Existing lasers generate too little average flux of photons, much less than is needed for production of an intense average electron beam current. Thus, there is an obvious problem. One can get either a high intense average electron beam current, but of poor quality, for example the electron beam current from a thermionic electron gun, or an electron beam of a good quality from the RF photocathode gun, but with low average intensity.

Another severe problem concerns the optical resonator of the FEL. Mirrors that form optical resonators become vulnerable to damage as the power level of the FEL increases.

SUMMARY OF THE INVENTION

The Ignition Feedback Regenerative Free Electron Laser Amplifier(IFRA FEL) is made from a RF photocathode gun, a RF initial accelerator, a main linear accelerator, a bunch compressor, a bunch decompressor, a regenerative FEL amplifier, and a beam dump. A feed-back loop from the FEL undulator output to the RF photocathode gun provides the photon flux necessary to produce a high average electron beam current. A frequency up converter is used to change the frequency of light from the FEL undulator output to a frequency which maximizes electron current from the FR photocathrode. Another loop in the light beam provides the input power for the regenerative FEL amplifier. A mode filter controls the power levels which are fed back, thus preventing developing positive feedback loops and electron beam instabilities associated with them. A conventional laser is used to start up the operation of the RF photocathode gun and the regenerative FEL amplifier. The main linear accelerator is used for (1) acceleration of electrons before radiation and (2) deceleration of spent electrons after the radiation. The linear accelerator may be built from room temperature normal conducting cavities. The linear accelerator may also be built using superconducting cavities. Superconducting cavities greatly reduce the demand for RF power needed for operation. A deceleration of the electrons before they can be safely sent to a dump is also needed to reduce the radiation hazards.

The problem of obtaining a good quality high intense electron beam is solved as follows: In a steady state operation of the FEL, a small fraction of the output light is diverted and converted to the ultraviolet. This light is sent to the photocathode where it creates new electrons. These electrons will radiate in the FEL and a fraction of their radiation can be taken to create new electrons and so on. For the purpose of illustration, assume that ten thousand visible wavelength photons are converted to one thousand ultraviolet wavelength photons and produce a single electron in the photocathode. This single electron radiates one million visible wavelength photons in the FEL, so just 1% of this radiation will supply enough photons to create a new electron. Now, the system is closed and self-supported, but it needs a start up (ignition). For ignition, a conventional laser is used. This laser has to be able to support the operation for a short time until first light from the output radiation reaches the photocathode. The start up laser cannot produce the electron beam intensity from the RF photocathode desired but it only has to start operations as the FEL will produce the greater optical input to produce the good quality high intense electron beam needed from the RF photocathode. In this example, a relatively low conversion efficiency of photons to electrons of 0.1% was used. This is the efficiency that one can currently obtain on rugged metallic photocathodes having a long lifetime. Existing photocathodes built from semiconductor materials have better conversion efficiency, but possess much poorer lifetime especially in a high average electron beam current environment. This drawback makes it impractical to use them for industry application with a continuous run time.

By operating the FEL in the regenerative amplifier mode, the problems with cavity mirrors are avoided. Since there is no optical resonator, there are no cavity mirrors. The idea again is to use a fraction of the output radiation from the FEL undulator and feed it back to the beginning of the FEL undulator. This light must appear there simultaneously with the following electron bunch. Then both the electrons and the light propagate through the FEL undulator together. A subsequent interaction results in a fast microbunching of the electron beam (modulation of its longitudinal density) and a coherent radiation of electrons. Tapering the FEL undulator after the microbunching has been achieved compensates the effect of electron energy losses and improves efficiency of the regenerative amplifier.

The above configuration will permit optical power of 200 kW and an optical wavelength of 840 nm, what is currently sufficient for LPB, while various applications at various power levels and wavelengths are possible.

DESCRIPTION OF THE PREFERRED EMBODIMENT

Figure 1:
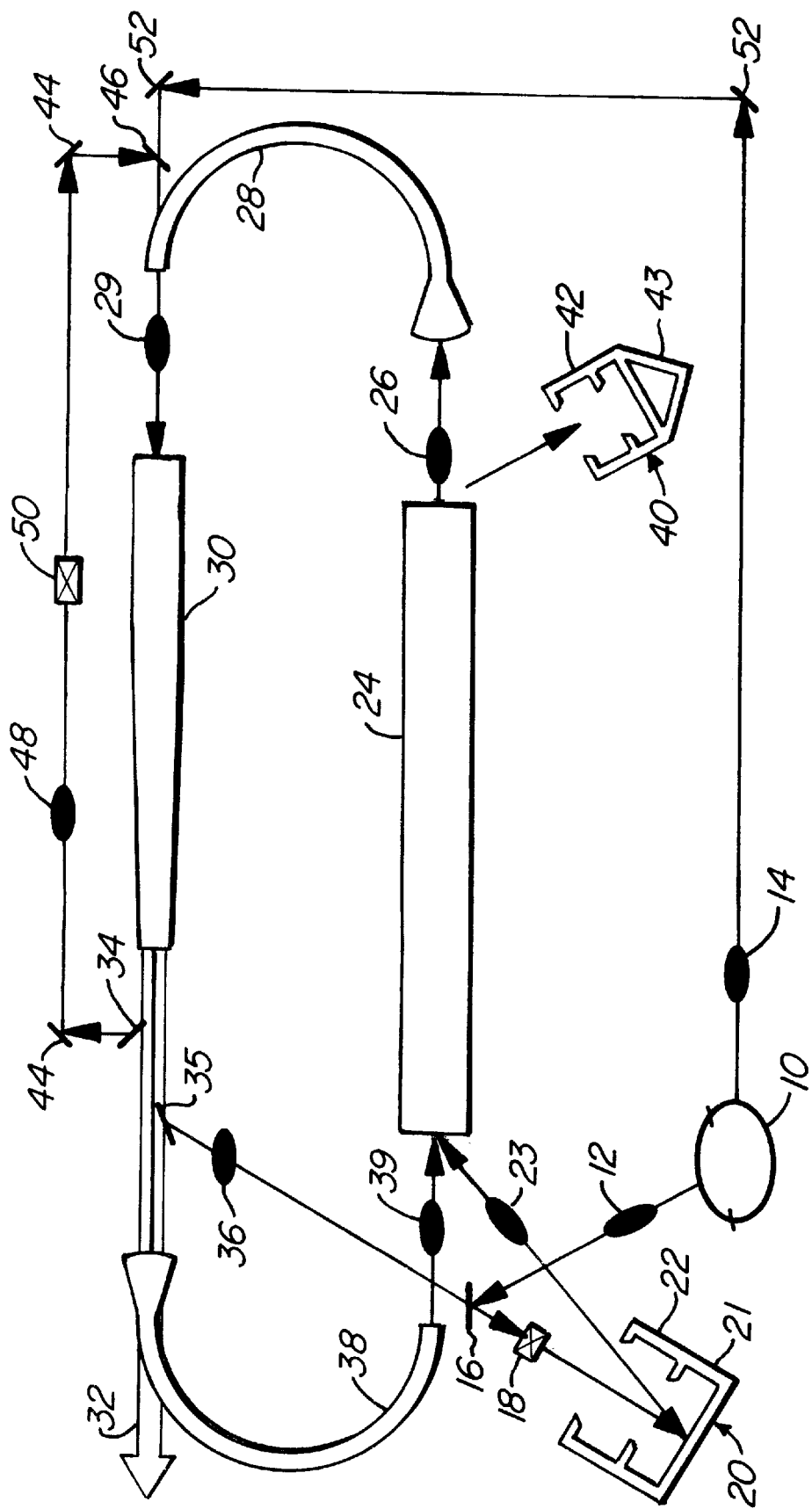
FIG. 1 is a schematic drawing of the present invention.

FIG. 1 is a schematic drawing of the present invention. An ignition laser 10, which can be any commercially available short pulse laser of predetermined wavelength, for example 840 nm, emits an optical pulse which can be divided into two optical pulses 12 and 14. Optical pulse 12 is fed via a mirror 16 through a frequency up converter 18 into an injector 20. In practice, optical pulse 12 may be directed in any number of ways. The present configuration is shown only for illustrative purposes. Frequency up converter 18 changes the wavelength of the original optical pulse 12 to a preselected wavelength, for example 210 nm. Injector 20 provides a predetermined electron pulse when photocathode gun 21 is illuminated with optical pulse 12 at a desired wavelength and preset power level. This electron pulse is a bunch of electrons traveling at high speed close to the speed of light. Injector 20 has two portions, a photocathode gun 21 and an accelerator 22. Electrons released by photocathode gun 21 are accelerated by accelerator 22 to a high energy, and exit injector 20 as electron bunch 23. To preserve the small emittance of electron bunch 23, a high accelerating gradient is needed at photocathode gun 21. One option for photocathode gun 21 is one that utilizes the emittance compensation technique. This permits injector 20 to provide a high peak electron current with the appropriate emittance and energy spread. Providing a good quality electron bunch is significant when they will be regenerate.

An example of suitable design parameters for photocathode gun 21 are:
RF frequency 476 MHz
Peak electric field at the cathode 200 kV/cm
Electron beam peak current 50 A
Electron bunch charge 1 nC
Normalized electron beam emittance 10 mm mrad
Electron beam energy spread $5 \times 10^{-3}$
Photocathode material copper
Quantum yield (at a wavelength 210 nm) $10^{-3}$ For purposes of example only, injector 20 provides the electrons with a 14 MeV energy. Injector 20 has an output electron bunch 23 which is fed into linear accelerator 24 by steering magnets, not shown. The use of steering magnets is well known in the art.

When electron bunch 23 passes through linear accelerator 24 energy is added to the electrons. If for example electron bunch 23 is at a 14 MeV energy level coming out of injector 20, upon exiting linear accelerator 24 the energy has increased to a higher level, say 90 MeV. Thus, when electron bunch 23 exits linear accelerator 24 it is now an enhanced energy or enhanced electron bunch 26. Both accelerator 22 in injector 20 and linear accelerator 24 operate with RF cavities at a rather low RF frequency, say, 476 MHz for the above example. This low frequency keeps beam instabilities and emittance dilution at a minimum. For the same reason special care should be taken for the suppression of high order modes (HOM) excited in the RF cavities of injector 20 and linear accelerator 24 by electron bunch 23. As an example of an RF cavity suitable for this purpose, is a single mode RF cavity developed at Lawrence Berkeley National Laboratory.

After exiting linear accelerator 24 enhanced electron bunch 26 enters a bunch compressor 28. Bunch compressor 28 may be built from a set of drift spaces, bending magnets, quadrupoles, sextupoles, and possibly octupoles (not shown). The use of drift spaces, bending magnets, quadrupoles, sextupoles and octupoles is well known in the art. Bunch compressor 28 also directs enhanced electron bunch 26 as desired. For the above example enhanced electron bunch 26 has to have a bunch-length of about 5 mm. Upon exiting bunch compressor 28 enhanced electron bunch 26 becomes a compressed electron bunch 29 with a bunch-length reduced to approximately 1 mm in this example. This bunch compression allows an increase in the electron peak current in this example from 50 A in the linear accelerator 24 to 200 A after bunch compressor 28. To perform this function, the arc angle shown does not have to be 180° but is a matter of design.

Compressed electron bunch 29 is now steered into undulator 30, which may also be described as an FEL amplifier. Compressed electron bunch 29 may enter undulator 30 simultaneously with an optical pulse 14, which is steered and focused into undulator 30 by a set of optical elements shown as mirrors 52. In practice, optical pulse 14 may be directed in any number of ways and the present configuration is shown for only illustrative purposes. Optical pulse 14 passing through undulator 30 together with compressed electron bunch 29 gains energy in this example from 30 microjoule at entry of undulator 30 to 1700 microjoule at the exit of undulator 30. This energy is actually radiated by electrons of compressed electron bunch 29. By repeating the above described process with a repetition frequency of, say, 119 MHz (in this illustrative example it means sending electron bunch 23 in every fourth cycle of the RF frequency), a high radiation power, say, 200 kW is achieved.

Undulator 30 may be either a linear undulator or circular undulator. To date the preferred embodiment is for compressed electron bunch 29 to first enter a uniform section of undulator 30 and then pass through a tapered section of undulator before exiting. Thus, undulator 30 may have two sections: a uniform section extending in this example from the entrance of undulator 30 to a distance of approximately two meters into undulator 30. After two meters undulator 30 has a tapered section extending in this example from the end of the linear section to the end of undulator 30, an additional seven meters. The total length of nine meters is a design option. The interaction of the electrons of compressed electron bunch 29 with optical pulse 14 in the uniform section of undulator 30 results first in the modulation of the electron energy at an optical frequency and second in the electron microbunching (modulation of the compressed electron bunch 29 longitudinal density). In the tapered section of undulator 30, bunched electrons radiate coherently. The structure of the taper should be designed to compensate for the effect of electron energy losses on the radiation in order to maximize the efficiency of the bunched electron radiation.

Upon exiting undulator 30, compressed electron bunch 29 is directed by a bunch decompressor 38 built from a set of drift spaces, bending magnets, quadrupoles, sextupoles, and possibly octupoles, not shown. Bunch decompressor 38 decompresses compressed electron bunch 29 and upon exiting from bunch decompressor 38 compressed electron bunch 29 becomes a decompressed electron bunch 39 with a bunch-length back to approximately 5 mm in this example. Bunch decompressor 38 also directs decompressed electron bunch 39 to linear accelerator 24 to pass through for a second time.

The light emitted by electrons of compressed electron bunch 29 while in undulator 30 becomes an optical beam 32. Optical beam 32 passes through a dividing means 35 which passes most of optical beam 32 but does direct a small portion, say 3%, as optical beam 36, back into injector 20 to initiate another cycle. In practice, optical beam 36 may be created and directed in any number of ways. Dividing means 34 may be a pickoff mirror, beam splitter, or any device that achieves the desired function. Optical beam 36 passes through frequency up converter 18 that transforms the wavelength of optical beam 36 to the optimal wavelength for photocathode gun 21. Optical beam 36 has a significantly higher power level than optical pulse 12. It was noted above that copper was a preferred choice for the photocathode material. While copper does not produce electrons as readily as many state of the art photocathodes because of its high work function, copper is a far better choice at high power levels. Optical beam 36 grows as the output beam 32 of the FEL grows. Thus, more electrons are emitted as optical beam 36 increases in power. Copper or a similar material will last longer for continuous operation than many materials. As copper erodes there is still copper being exposed. Thus the present invention can increase output power not just because of increasing optical resonance but also because of increased intensity electron bunches from photocathode 21.

Optical beam 32 also passes through a second dividing means 34 which passes most of optical beam 32 but does direct a small portion, say 2%, as an optical beam 48, back into the beginning of undulator 30 via mirrors 44 and 46 to initiate another cycle of radiation. In practice, optical beam 48 may be picked off and directed in any number of ways. The configurations shown for optical beans 36 and 48 are only for illustrative purposes. Optical beam 48 appears at the beginning of undulator 30 at the same time as another compressed electron bunch 29. At approximately the same time optical beam 36 reaches photocathode gun 21. From this moment ignition laser 10 does not send new optical pulses 14 to undulator 30 and new optical pulses 12 to the photocathode gun 21 and can be switched off. The accelerator-FEL system becomes self supported.

The light in optical beam 48 may fluctuate from pulse to pulse in optical power, which in turn can cause an uncontrolled power growth and a runaway instability. To prevent a runaway instability, mode filter 50 is inserted in optical beam 48. It is shown inserted between mirrors 44, but this is a design choice. Mode filter 50 is a crystal which becomes opaque above a preset optical power level. In effect, mode filter 50 serves as an automatic shutoff valve to prevent self-destruction. An example of such crystals are those used in laser goggles to prevent eye injury.

Decompressed electron bunch 39 is fed into linear accelerator 24 by steering magnets, not shown. The time of its arrival there is adjusted so that it enters linear accelerator 24 at the decelerating phase of the RF cycle. When decompressed electron bunch 39 passes through linear accelerator 24, energy is subtracted from electrons and returned to the electromagnetic field of the RF cavities. If the average energy of electrons in decompressed electron bunch 39 entering linear accelerator 24 is at a 87 MeV energy level, upon exiting linear accelerator 24, the energy has decreased to a level of about 11 MeV.

A return of the energy back to the electromagnetic field of the RF cavities, as it is described above, does reduce the power consumption by the linear accelerator 24. Basically, the power is needed only to compensate the resistive wall energy losses in the room temperature normal conducting RF cavities. Room temperature normal conducting RF cavities are capable of performing the needed tasks. If RF superconducting cavities are used they will allow further reduction of energy consumption.

Upon reaching a low energy, say 11 MeV as above, decompressed electron bunch 39 can be turned to an electron beam dump 40. This deceleration is critical for a dramatic reduction of the radiation hazards in the electron beam dump 40. This deceleration brings the energy of electrons below a threshold energy for giant neutron resonance in most materials, thus making them incapable of creating radioactive isotopes. The decelerated electron beam still has significant energy and poses a radiation hazard. To safely terminate it, the electron beam dump 40 may have its own further deceleration stage 42. Decompression beam 39 has energy reduced in decelerator stage 42 before the electrons are collected by a collector 43 to accept the spent electrons.

What is claimed is:

1. An ignition feedback regenerative FEL amplifier comprising:

A. An ignition laser which emits optical pulses along a predetermined path;

B. an up converter placed in said optical pulse path, said up converter designed to change the wavelength of said optical pulses to a predetermined wavelength pulse;

C. an injector placed in the path of said changed wavelength pulse such that an a electron bunch of a preselected energy is emitted in response to each of said pulses of predetermined wavelength, quality, and power level;

D. a linear accelerator in the path of said electron bunch, said linear accelerator increases the energy contained in said electron bunches such that upon exiting said linear accelerator enhanced electron bunches are emitted;

E. a bunch compressor around the path of said enhanced electron bunches such that said enhanced electron bunches are directed into a predetermined direction as a compressed electron bunch;

F. an undulator placed in the path of said compressed electron bunches traveling along said predetermined direction, said undulator functioning as a free electron laser amplifier for said compressed electron bunches such that an optical beam is emitted from said undulator for each of said compressed electron bunches;

G. a first dividing means in the path of said optical beam emitted from said undulator for directing a predetermined portion of said optical beam back into said injector via said up converter to change the wavelength of said portion of said optical beam from said undulator to initial a new electron pulse, said new electron pulse having an intensity determined by the power level of said portion of said optical beam from said first dividing means, said predetermined portion of said optical beam is set at a level which generates a larger electron bunch from said injection which in turn gives a higher energy optical beam from said undulator, and in turn said predetermined portion of said optical beam increases due to said higher energy optical beam, thus an increasing feedback situation has been created;

H. a second dividing means in the path of said optical beam emitted from said undulator for looping a portion of said optical beam back to said undulator so as to enter at the same time as a compressed electron bunch enters said undulator;

I. a plurality of mirrors placed to direct said optical beam portion created by said second dividing means back into said undulator so as to enhance optical emission of a compressed electron bunch while in said undulator;

J. a mode filter placed in the path of said beam portion created by said second dividing means for stopping passage of said optical beam beyond a preset power level;

K. a bunch decompressor around the path of said compressed electron bunches after they have passed through said undulator such that said electron bunches are redirected into said linear accelerator a second time after being decompressed so as to be decelerated by said linear accelerator; and L. a beam dump aligned to receive said decompressed electron bunch after it has been decelerated by passage through said linear accelerator said second time.

2. An ignition feedback regenerative FEL amplifier as described in claim 1 further comprising an undulator with a linear portion at the entrance of said undulator for said compressed electron bunch and a tapered portion for the remainder of said undulator.

3. An ignition feedback regenerative FEL amplifier as described in claim 1 where said first diving means comprises a pickoff mirror.

4. An ignition feedback regenerative FEL amplifier as described in claim 2 where said first dividing means comprises a pickoff mirror.

5. An ignition feedback regenerative FEL amplifier as described in claim 1 where said second dividing means comprises a pickoff mirror.

6. An ignition feedback regenerative FEL amplifier as described in claim 2 where said second dividing means comprises a pickoff mirror.

7. An ignition feedback regenerative FEL amplifier as described in claim 3 where said second dividing means comprises a pickoff mirror.

8. An ignition feedback regenerative FEL amplifier as described in claim 4 where said second dividing means comprises a pickoff mirror.

9. An ignition feedback regenerative FEL amplifier as described in claim 1 where said injector comprises a metallic photcathode gun and an accelerator.

10. An ignition feedback regenerative FEL amplifier as described in claim 2 where said injector comprises a metallic photcathode gun and an accelerator.

11. An ignition feedback regenerative FEL amplifier as described in claim 3 where said injector comprises a metallic photcathode gun and an accelerator.

12. An ignition feedback regenerative FEL amplifier as described in claim 4 where said injector comprises a metallic photcathode gun and an accelerator.

13. An ignition feedback regenerative FEL amplifier as described in claim 5 where said injector comprises a metallic photcathode gun and an accelerator.

14. An ignition feedback regenerative FEL amplifier as described in claim 6 where said injector comprises a metallic photcathode gun and an accelerator.

15. An ignition feedback regenerative FEL amplifier as described in claim 7 where said injector comprises a metallic photcathode gun and an accelerator.

16. An ignition feedback regenerative FEL amplifier as described in claim 8 where said injector comprises a metallic photcathode gun and an accelerator.

17. An ignition feedback regenerative FEL amplifier as described in claim 1 where said beam dump comprises a decelerator stage followed by a conical cathode.

18. An ignition feedback regenerative FEL amplifier as described in claim 2 where said beam dump comprises a decelerator stage followed by a conical cathode.

19. An ignition feedback regenerative FEL amplifier as described in claim 3 where said beam dump comprises a decelerator stage followed by a conical cathode.

20. An ignition feedback regenerative FEL amplifier as described in claim 4 where said beam dump comprises a decelerator stage followed by a conical cathode.

21. An ignition feedback regenerative FEL amplifier as described in claim 5 where said beam dump comprises a decelerator stage followed by a conical cathode.

22. An ignition feedback regenerative FEL amplifier as described in claim 6 where said beam dump comprises a decelerator stage followed by a conical cathode.

23. An ignition feedback regenerative FEL amplifier as described in claim 7 where said beam dump comprises a decelerator stage followed by a conical cathode.

24. An ignition feedback regenerative FEL amplifier as described in claim 8 where said beam dump comprises a decelerator stage followed by a conical cathode.

25. An ignition feedback regenerative FEL amplifier as described in claim 9 where said beam dump comprises a decelerator stage followed by a conical cathode.

26. An ignition feedback regenerative FEL amplifier as described in claim 10 where said beam dump comprises a decelerator stage followed by a conical cathode.

27. An ignition feedback regenerative FEL amplifier as described in claim 11 where said beam dump comprises a decelerator stage followed by a conical cathode.

28. An ignition feedback regenerative FEL amplifier as described in claim 12 where said beam dump comprises a decelerator stage followed by a conical cathode.

29. An ignition feedback regenerative FEL amplifier as described in claim 13 where said beam dump comprises a decelerator stage followed by a conical cathode.

30. An ignition feedback regenerative FEL amplifier as described in claim 14 where said beam dump comprises a decelerator stage followed by a conical cathode.

31. An ignition feedback regenerative FEL amplifier as described in claim 15 where said beam dump comprises a decelerator stage followed by a conical cathode.

32. An ignition feedback regenerative FEL amplifier as described in claim 16 where said beam dump comprises a decelerator stage followed by a conical cathode.

33. An ignition feedback regenerative FEL amplifier comprising:
   A. An ignition laser which emits a first and a second optical pulses along a predetermined path;
   B. an up converter placed in said first optical pulse path, said up converter designed to change the wavelength of said first optical pulses to a predetermined wavelength pulse;
   C. an injector placed in the path of said changed wavelength pulse such that an electron bunch of a preselected energy is emitted in response to each of said pulses of predetermined wavelength, quality, and power level;
   D. a linear accelerator in the path of said electron bunch, said linear accelerator increases the energy contained in said electron bunches such that upon exiting said linear accelerator enhanced electron bunches are emitted;
   E. a bunch compressor around the path of said enhanced electron bunches such that said enhanced electron bunches are directed into a predetermined direction as a compressed electron bunch;
   F. an undulator placed in the path of said compressed electron bunches traveling along said predetermined direction, said undulator functioning as a free electron laser amplifier for said compressed electron bunches such that an optical beam is emitted from said undulator for each of said compressed electron bunches;
   G. a first dividing means in the path of said optical beam emitted from said undulator for directing a predetermined portion of said optical beam back into said injector via said up converter to change the wavelength of said portion of said optical beam from said undulator to initial a now electron pulse, said new electron pulse having an intensity determined by the power level of said portion of said optical beam from said first dividing means, said predetermined portion of said optical beam is set at a level which generates a larger electron bunch from said injector which in turn gives a higher energy optical beam from said undulator, and in turn said predetermined portion of said optical beam increases due to said higher energy optical beam, thus an increasing feedback situation has been created;
   H. a second dividing means in the path of said optical beam emitted from said undulator for looping a portion of said optical beam back to said undulator so as to enter at the same time as a compressed electron bunch enters said undulator;
   I. a plurality of mirrors placed to direct said optical beam portion created by said second dividing means back into said undulator so as to enhance optical emission of a compressed electron bunch while in said undulator;
   J. a mode filter placed in the path of said beam portion created by said second dividing means for stopping passage of said optical beam beyond a preset power level;
   K. a bunch decompressor around the path of said compressed electron bunches after they have passed through said undulator such that said electron bunches are redirected into said linear accelerator a second time after being decompressed so as to be decelerated by said linear accelerator;
   L. an optical path for said second optical pulse from said ignition laser which directs said second optical pulse into said undulator at the same time as said compressed electron bunch enters said undulator; and
   M. a beam dump aligned to receive said decompressed electron bunch after it has been decelerated by passage through said linear accelerator said second time.

34. An ignition feedback regenerative FEL amplifier as described in claim 33 further comprising an undulator with a linear portion at the entrance of said undulator for said compressed electron bunch and a tapered portion for the remainder of said undulator.

35. An ignition feedback regenerative FEL amplifier as described in claim 33 where said first diving means comprises a pickoff mirror.

36. An ignition feedback regenerative FEL amplifier as described in claim 34 where said first dividing means comprises a pickoff mirror.

37. An ignition feedback regenerative FEL amplifier as described in claim 33 where said second dividing means comprises a pickoff mirror.

38. An ignition feedback regenerative FEL amplifier as described in claim 34 where said second dividing means comprises a pickoff mirror.

39. An ignition feedback regenerative FEL amplifier as described in claim 35 where said second dividing means comprises a pickoff mirror.

40. An ignition feedback regenerative FEL amplifier as described in claim 36 where said second dividing means comprises a pickoff mirror.

41. An ignition feedback regenerative FEL amplifier as described in claim 33 where said injector comprises a metallic photcathode gun and an accelerator.

42. An ignition feedback regenerative FEL amplifier as described in claim 34 where said injector comprises a metallic photcathode gun and an accelerator.

43. An ignition feedback regenerative FEL amplifier as described in claim 35 where said injector comprises a metallic photcathode gun and an accelerator.

44. An ignition feedback regenerative FEL amplifier as described in claim 36 where said injector comprises a metallic photcathode gun and an accelerator.

45. An ignition feedback regenerative FEL amplifier as described in claim 37 where said injector comprises a metallic photcathode gun and an accelerator.

46. An ignition feedback regenerative FEL amplifier as described in claim 38 where said injector comprises a metallic photcathode gun and an accelerator.

47. An ignition feedback regenerative FEL amplifier as described in claim 39 where said injector comprises a metallic photcathode gun and an accelerator.

48. An ignition feedback regenerative FEL amplifier as described in claim 40 where said injector comprises a metallic photcathode gun and an accelerator.

49. An ignition feedback regenerative FEL amplifier as described in claim 33 where said beam dump comprises a decelerator stage followed by a conical cathode.

50. An ignition feedback regenerative amplifier as described in claim 34 where said beam dump comprises a decelerator stage followed by a conical cathode.

51. An ignition feedback regenerative amplifier as described in claim 35 where said beam dump comprises a decelerator stage followed by a conical cathode.

52. An ignition feedback regenerative FEL amplifier as described in claim 36 where said beam dump comprises a decelerator stage followed by a conical cathode.

53. An ignition feedback regenerative FEL amplifier as described in claim 37 where said beam dump comprises a decelerator stage followed by a conical cathode.

54. An ignition feedback regenerative FEL amplifier as described in claim 38 where said beam dump comprises a decelerator stage followed by a conical cathode.

55. An ignition feedback regenerative FEL amplifier as described in claim 39 where said beam dump comprises a decelerator stage followed by a conical cathode.

56. An ignition feedback regenerative FEL amplifier as described in claim 40 where said beam dump comprises a decelerator stage followed by a conical cathode.

57. An ignition feedback regenerative FEL amplifier as described in claim 41 where said beam dump comprises a decelerator stage followed by a conical cathode.

58. An ignition feedback regenerative FEL amplifier as described in claim 42 where said beam dump comprises a decelerator stage followed by a conical cathode.

59. An ignition feedback regenerative FEL amplifier as described in claim 43 where said beam dump comprises a decelerator stage followed by a conical cathode.

60. An ignition feedback regenerative FEL amplifier as described in claim 44 where said beam dump comprises a decelerator stage followed by a conical cathode.

61. An ignition feedback regenerative FEL amplifier as described in claim 45 where said beam dump comprises a decelerator stage followed by a conical cathode.

62. An ignition feedback regenerative FEL amplifier as described in claim 46 where said beam dump comprises a decelerator stage followed by a conical cathode.

63. An ignition feedback regenerative FEL amplifier as described in claim 47 where said beam dump comprises a decelerator stage followed by a conical cathode.

64. An ignition feedback regenerative FEL amplifier as described in claim 48 where said beam dump comprises a decelerator stage followed by a conical cathode.

* * * * *